(12) United States Patent
Rune et al.

(10) Patent No.: US 10,917,833 B2
(45) Date of Patent: Feb. 9, 2021

(54) IMPLICIT SYSTEM INFORMATION (SI) CONTENT VARIATION ENABLING SOFT COMBINING

(71) Applicant: TELEFONAKTIEBOLAGET LM ERICSSON (PUBL), Stockholm (SE)

(72) Inventors: Johan Rune, Lidingö (SE); Pål Frenger, Linköping (SE); Stefan Wager, Espoo (FI)

(73) Assignee: TELEFONTAKIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/482,709

(22) PCT Filed: Jan. 31, 2018

(86) PCT No.: PCT/IB2018/050615
§ 371 (c)(1),
(2) Date: Jul. 31, 2019

(87) PCT Pub. No.: WO2018/142309
PCT Pub. Date: Aug. 9, 2018

(65) Prior Publication Data
US 2020/0245228 A1 Jul. 30, 2020

Related U.S. Application Data

(60) Provisional application No. 62/453,785, filed on Feb. 2, 2017.

(51) Int. Cl.
*H04W 48/00* (2009.01)
*H04W 16/28* (2009.01)
(Continued)

(52) U.S. Cl.
CPC .......... *H04W 48/10* (2013.01); *H04B 7/0689* (2013.01); *H04B 7/0871* (2013.01); *H04W 16/28* (2013.01)

(58) Field of Classification Search
CPC .... H04W 48/10; H04W 16/28; H04B 7/0689; H04B 7/0871; H04L 1/1816; H04L 1/08
(Continued)

(56) References Cited

U.S. PATENT DOCUMENTS 9,622,267 B2 * 4/2017 Kwon ................. H04W 72/005
2007/0162610 A1 * 7/2007 Un ........................ H04W 80/02
709/230
(Continued)

OTHER PUBLICATIONS

Ericsson: Minimum system information delivery, R1-1700296, Jan. 16-20, 2017 (Year: 2017).*
(Continued)

*Primary Examiner* — Inder P Mehra

(57) ABSTRACT

According to certain embodiments, a method is disclosed for use in a network node. The method comprises transmitting a set of system information transmission. Each transmission within the set comprises system information, and the set of transmissions enable soft combining by configuring a portion of the system information to be the same for each transmission within the set. For each transmission, the method comprises providing an indication of an identifier associated with the respective transmission. The indication is provided other than in the system information.

31 Claims, 8 Drawing Sheets

(51) Int. Cl.
*H04B 7/06* (2006.01)
*H04B 7/08* (2006.01)
*H04L 1/18* (2006.01)
*H04L 1/08* (2006.01)
*H04W 48/10* (2009.01)

(58) Field of Classification Search
USPC ........................................................ 455/434
See application file for complete search history.

(56) References Cited

U.S. PATENT DOCUMENTS

| | | | | |
|---|---|---|---|---|
| 2009/0319844 | A1* | 12/2009 | Chiou | H04L 1/006 714/746 |
| 2011/0003600 | A2* | 1/2011 | Beckmann | H04W 4/12 455/455 |
| 2015/0016341 | A1* | 1/2015 | Trainin | H04W 16/28 370/328 |
| 2016/0277983 | A1* | 9/2016 | Kim | H04W 72/0413 |
| 2016/0345300 | A1* | 11/2016 | Kim | H04L 1/08 |
| 2017/0201982 | A1* | 7/2017 | Rico Alvarino | H04W 4/70 |
| 2018/0132273 | A1* | 5/2018 | Zhang | H04W 72/1268 |

OTHER PUBLICATIONS

Ericsson, Minimum system information delivery, R1-1700296, 3GPP TSG-RAN WG1 NR adhoc, Spokane, WA, USA, Jan. 16-20, 2017.
Nokia, et al., NR-PBCH Design, R1-17001060, 3GPP TSG-RAN WG1#NR, Spokane, U.S.A., Jan. 16-20, 2017.
Samsung, SS BW and multiplexing, R1-1700884, 3GPP TSG RAN WG1 NR AH, Spokane, USA, Jan. 16-20, 2017.
Huawei, et al., NR Primary and Secondary Synchronization Signals Design, R1-1611261, 3GPP TSG RAN WG1 Meeting #87, Reno, USA, Nov. 14-18, 2016.

* cited by examiner

IMPLICIT SYSTEM INFORMATION (SI) CONTENT VARIATION ENABLING SOFT COMBINING

This application is a 371 of International Application No. PCT/162018/050615, filed Jan. 31, 2018, which claims the benefit of U.S. Application No. 62/453,785, filed Feb. 2, 2017, the disclosures of which are fully incorporated herein by reference.

TECHNICAL FIELD

Certain embodiments of the present disclosure relate to wireless communications in general and, more particularly, to implicit variation of system information (SI) in order to facilitate soft combining.

BACKGROUND

The Third Generation Partnership Project (3GPP) is currently standardizing the fifth generation (5G) system. In 5G, the radio access network is referred to as New Radio (NR) and the core network is referred to as Next Generation Core (NGC). The 5G system will often be deployed in conditions where achieving appropriate coverage (e.g., cell edge coverage) may be challenging. This is especially the case when high carrier frequencies (e.g., >6 GHz) are utilized. Two different ways of combating the low signal-to-noise ratio (SNR) or signal-to-interference-plus-noise ratio (SINR) a user equipment (UE) can experience at the coverage edge are to use high-gain beamforming (i.e., narrow beams) or repetition of the transmission.

In the case of system information (SI), which has to be regularly distributed in the entire coverage area (e.g., an entire cell), the information is broadcast and intended for all UEs present in the coverage area. This excludes tailored beamforming towards a single UE. Instead, either beam sweeping of narrow beams (i.e., sequential transmissions of narrow beams until the entire coverage area—e.g., cell—is covered) or repetition of wide (or omnidirectional) beam transmissions is used. When repetition is used, it is assumed that the UE can soft-combine receptions of multiple transmissions in order to gather enough energy to achieve acceptable SNR/SINR. Note that sweeping of narrow beams does not exclude that soft-combining of multiple beam transmissions may be used, provided that the UE is able to receive more than one beam in the sweep, e.g., a set of adjacent beams transmitted in directions close to (and possibly partly overlapping) each other and/or arbitrary beams in the sweep where reflections cause them to reach the UE despite disparate/diverging transmit/transmission (TX) directions.

An additional challenge, especially in high frequencies, is that some access nodes, e.g., gNBs, are expected to use analog beamforming. Analog beamforming implies directional restrictions in that the access node/gNB can only transmit in one beam direction (or beam shape) at a time (analog TX beamforming) and/or only receive in one beam direction at a time (analog receive/reception (RX) beamforming).

To ensure that a gNB monitors the physical random access channel (PRACH) in the right direction when using analog receive/transmit (RX/TX) beamforming, different PRACH configurations may be provided for different RX directions. To match the RX directions with the PRACH configurations (and the UEs receiving the configurations), the PRACH configuration provided in the SI is different in different TX directions for the SI transmissions (where the SI transmitted in a TX direction matching a certain RX direction includes a PRACH configuration that the gNB will monitor in that specific RX direction). Hence, each narrow beam transmission of SI in a beam sweep may contain PRACH configuration pointing out different transmission resources (e.g., time/frequency resources). Alternatively, as it is likely that the interval between two narrow beam transmissions of SI in a beam sweep, at least the transmission of the synchronization signal (SS) Block will occupy a shorter timespan than the PRACH resource, a set of adjacent SI transmissions may point out a certain PRACH resource, while the subsequent set of adjacent SI transmissions point out another PRACH resource. Such a set of SI transmissions should typically together occupy a timespan equal to the length (in time) of a PRACH resource.

For NR, it has been decided to divide the SI into "minimum SI" and "other SI", where the minimum SI is the SI that is required to access the cell. The minimum SI is periodically broadcast in a cell, while the other SI may be broadcast or delivered on demand, e.g., triggered by a random access preamble or a random access message 3 from a UE in idle or inactive (i.e., the "new state" agreed for NR) mode or requested via radio resource control (RRC) signalling from a UE in connected mode. It has also been decided to transmit a broadcast channel, denoted new radio-physical broadcast channel (NR-PBCH), following a periodic synchronization signal consisting of two parts from which the physical cell identity (PCI) can be derived: (1) new radio-primary synchronization signal (NR-PSS), and (2) new radio-secondary synchronization signal (NR-SSS). Together, the NR-PSS+NR-SSS+NR-PBCH form an entity denoted SS Block. At least some of the minimum SI will be broadcast on the NR-PBCH. It is not decided whether all of the minimum SI, or which part(s) thereof, that will be transmitted on the NR-PBCH. Some of the minimum SI may be broadcast on another channel. It has further been agreed that a number of SS Block transmissions can lumped together, i.e., transmitted in a tight series denoted "SS Burst".

One proposed way of structuring the delivery of SI (in particular the minimum SI) in NR is depicted in FIG. 1. In FIG. 1, the minimum SI is broadcast in two different parts on two different broadcast channels. The broadcast channels are tentatively referred to as the Primary PBCH (or NR-PBCH$_1$) and Secondary PBCH (or NR-PBCH$_2$). The part of the minimum SI broadcast on the Primary PBCH is referred to as the Master Information Block (MIB), while the minimum SI part broadcast on the Secondary PBCH is structured in one or more System Information Block(s) (SIB(s)). The MIB contains data that configures the Secondary PBCH. The minimum SI broadcast on the Secondary PBCH, in turn, contains data that configures how "other SI" can be requested and delivered.

As discussed above, SI can be transmitted according to a mode of transmission that uses repeated wide (or omnidirectional) beams, or according to a mode of transmission that uses beam sweeping of narrow beams. Certain problems can be envisioned with supporting two modes of transmission of the SI. For example, with two different modes of transmission of the SI, the UE does not know beforehand what to expect and how to behave (e.g., soft-combining or not). A unified behavior to simplify UE implementation complexity would be desirable. However, the two modes of SI transmission have inherently different properties. Repeated wide (or omnidirectional) beam transmissions require soft-combining, whereas narrow beam transmissions require possibility to provide beam specific SI (or SI specific for a set of beams but different between sets). These aspects together pose a challenge that should preferably be addressed, and this disclosure proposes one or more solutions to this.

SUMMARY

To address the above described problem, it is proposed herein to introduce means to make it transparent for the UE whether the SI (or relevant parts of the SI) is transmitted using sweeping of narrow beams or repetition of wide (or omnidirectional) beams. This is desirable to get a unified solution and to limit the complexity, especially for UE implementations. The UE should thus be able to use the same behaviour whether wide (or omnidirectional) repeated beams or narrow sweeping beams are used. Since wide (or omnidirectional) repeated beams are assumed to require soft-combining at the coverage edge, the UE should be able to soft-combine multiple transmissions of periodically broadcast SI. This would in principle be possible for narrow sweeping beams too (provided that multiple beams reach the UE), but it does not work together with different SI content in different beams (or sets of beams) (to support analog beamforming, as described above).

Certain embodiments of the present disclosure provide two solution components to overcome the above dilemma. The first component of the solution includes an implicit means for indication of the transmission number in a multi-transmission of SI (in a sweep of narrow beams or repeated wide (or omnidirectional) beams), where this indication is not included in the transmitted SI. This means could consist of an additional component in the SS Block (e.g., a signal with properties similar to the properties of a synchronization signal and/or a reference signal), different scrambling of the transmitted SI (e.g., the NR-PBCH or NR-PBCH$_1$ transmission), different NR-SSS sequences, different NR-PSS sequences, and/or different NR-PSS/NR-SSS combinations. The second component of the solution includes a means for configuring SI differences that depend on the transmission number.

With the proposed solution, the UE's behavior is independent of the mode of SI transmission. The UE soft-combines subsequent transmissions of the SI until it has gathered enough energy to decode the SI and uses the implicit transmission number indication to derive the SI parameters that depend on the transmission number.

With the proposed solution, the network can support either or both of the two above described different modes of SI transmission—sweeping of narrow beams or repetition of wide (e.g., sector or omnidirectional) beams—or anything in between (e.g., sweeping of semi-wide/semi-narrow beams with one or a few repetitions). This is achieved with the advantageous simplification that the UE's behavior can be the same irrespective of SI transmission mode (i.e., from the UE's perspective it is a unified solution that is independent of the SI transmission mode).

Embodiments disclosed herein enable soft-combining of multiple SI transmissions, despite different SI configurations in the different transmissions, by keeping the nominal bit contents of the SI the same in all transmissions, but using a SI external means to indicate the transmission number and one or more transmission number dependent parameter(s) in the SI. This may be reflected in a network aspect and a UE aspect.

In some instances, the network includes SI transmission number dependent SI parameter definitions in the SI and keeps this information consistent across a set of SI transmissions, while the order number of an SI transmission in the set of SI transmissions is implicitly indicated by means not involving the actual SI content. This implicit indication may be based on an additional signal component (e.g., in the SS Block), different scrambling of different SI transmissions, different NR-SSS sequences or different NR-PSS sequences.

In certain embodiments, the UE maintains consistent behavior irrespective of SI transmission mode. It attempts to soft-combine successive SI transmissions until it can decode the SI and then uses the implicit SI transmission number indication to derive the SI transmission number dependent SI parameter(s).

The transmission number indications themselves can be used to indicate sets of SI transmissions which may be soft-combined, but it may also be useful to use other means for such indication and separation of sets of SI transmissions that may be soft-combined within each set but not across different sets. In one embodiment the UE uses a first signal sequence (Tertiary Synchronization Signal, TSS), a second signal sequence (NR-PSS), and a time window (the maximum SS Burst duration) to determine if it can soft-combine two received transmissions of SI, e.g., broadcast channel transmissions (e.g., NR-PBCH or Primary NR-PBCH). In some embodiments, the transmission number indications are replaced by symbol number indications.

According to certain embodiments, a network node is disclosed. The network node comprises processing circuitry and an interface. The processing circuitry is configured to prepare a set of system information transmissions. Each transmission within the set comprises system information. The set of transmissions enable soft combining by configuring a portion of the system information to be the same for each transmission within the set. The processing circuitry is also configured to, for each transmission, prepare an indication of an identifier associated with the respective transmission. The indication is provided other than in the system information. The interface is configured to transmit the set of system information transmissions and the indication of the identifier associated with each respective transmission.

According to certain embodiments, a method is disclosed for use in a network node. The method comprises transmitting a set of system information transmission. Each transmission within the set comprises system information, and the set of transmissions enable soft combining by configuring a portion of the system information to be the same for each transmission within the set. For each transmission, the method comprises providing an indication of an identifier associated with the respective transmission. The indication is provided other than in the system information.

According to certain embodiments, a computer program product is disclosed. The computer program product comprises a non-transitory computer readable storage medium having computer readable program code embodied in the medium. The computer readable program code, when executed by processing circuitry of a network node, causes the network node to perform actions. The actions comprise transmitting a set of system information transmissions. Each transmission within the set comprises system information. The set of transmissions enable soft combining by configuring a portion of the system information to be the same for each transmission within the set. The actions also comprise, for each transmission, providing an indication of an identifier associated with the respective transmission, the indication provided other than in the system information.

Any of the embodiments described in the previous three paragraphs (e.g., network node, method for use in a network node, and/or computer readable program code executed by processing circuitry of the network node) may include various additional features, such as one or more of the following features:

In some embodiments, each transmission within the set has an associated transmission number and the transmission number can be derived at least in part from the identifier provided by the indication.

In some embodiments, each transmission within the set has an associated symbol number and the identifier provided by the indication corresponds to the symbol number of the respective transmission.

In some embodiments, a portion of the system information comprises contents that depend on the identifier associated with the respective transmission.

In some embodiments, a physical random access channel (PRACH) configuration depends on the identifier associated with the respective transmission such that the PRACH configuration associated with one of the transmissions differs from the PRACH configuration associated with another of the transmissions.

In some embodiments, the indication is provided by encoding the indication on a reference signal. In some embodiments, the reference signal has an associated index that maps to an indication and the encoding consists of selecting the reference signal associated with the index which maps to the indication that should be implicitly provided (e.g., provided other than in the system information).

In some embodiments, the indication is provided by using different scrambling for each transmission within the set.

In some embodiments, the indication is provided by using a different primary synchronization sequence (PSS), a different secondary synchronization sequence (SSS), or a different PSS/SSS combination for each transmission within the set.

In some embodiments, the indication provided other than in the system information together with an explicit indication provided in each system information transmission enables a wireless device to determine that the transmissions belong to the set of system information transmissions and are therefore capable of being soft-combined.

In some embodiments, the set of system information transmissions is transmitted using a sweep of narrow beams that provide spatial repetition of the system information.

In some embodiments, the set of system information transmissions is transmitted using wide beams or omnidirectional beams that provide temporal repetition of the system information.

In some embodiments, the indication enables a wireless device to determine that the transmissions belong to the set of system information transmissions and are therefore capable of being soft-combined.

In some embodiments, a second set of system information transmissions is transmitted, and the indication enables a wireless device to determine that the transmissions belonging to the first set of system information transmissions cannot be soft-combined with the transmissions belonging to the second set of system information transmissions.

In some embodiments, a second set of system information transmissions is transmitted. The indication provided other than in the system information together with an explicit indication provided in each system information transmission in the first and second sets of system information transmissions enables a wireless device to determine that the transmissions belonging to the first set of system information transmissions cannot be soft-combined with the transmissions belonging to the second set of system information transmissions, the one of the transmissions belonging to the first set of system information transmissions is capable of being soft-combined with the other transmissions belonging to the first set of system information transmissions, and that one of the transmissions belonging to the second set of system information transmissions is capable of being soft-combined with the other transmissions belonging to the second set of system information transmissions.

In some embodiments, the set of system information transmissions comprises a plurality of subsets of transmission and the indication enables coherently soft-combining transmissions within the same subset and non-coherently soft-combining transmissions within different subsets.

According to certain embodiments, a wireless device is disclosed. The wireless device comprises an interface and processing circuitry. The interface is configured to receive a plurality of system information transmissions, each transmission comprising system information. The processing circuitry is configured to, for each transmission, determine an indication of an identifier associated with the respective transmission. The indication is received other than in the system information. The indication indicates whether the received transmissions belong to a set of system information transmissions for which a portion of the system information is configured to be the same for each transmission within the set such that soft-combining is enabled. The processing circuitry is configured to soft-combine the received transmissions for which soft-combining is enabled.

According to certain embodiments, a method is disclosed for use in a wireless device. The method comprises receiving a plurality of system information transmissions, each transmission comprising system information, and determining an indication of an identifier associated with each transmission. The indication is received other than in the system information, and the indication indicates whether the received transmissions belong to a set of system information transmissions for which a portion of the system information is configured to be the same for each transmission within the set such that soft-combining is enabled. The method comprises soft-combining the received transmissions for which soft-combining is enabled.

According to certain embodiments, a computer program product is disclosed. The computer program product comprises a non-transitory computer readable storage medium. The non-transitory computer readable medium has computer readable program code embodied in the medium. The computer readable program code, when executed by processing circuitry of a wireless device, causes the wireless device to perform actions. The actions receiving a plurality of system information transmissions, each transmission comprising system information, and determining an indication of an identifier associated with each transmission. The indication is received other than in the system information, and the indication indicates whether the received transmissions belong to a set of system information transmissions for which a portion of the system information is configured to be the same for each transmission within the set such that soft-combining is enabled. The actions comprise soft-combining the received transmissions for which soft-combining is enabled.

Any of the embodiments described in the previous three paragraphs (e.g., wireless device, method for use in a wireless device, and/or computer readable program code executed by processing circuitry of the wireless device) may include various additional features, such as one or more of the following features:

In some embodiments, each transmission within the set has an associated transmission number and the transmission number can be derived at least in part from the identifier received in the indication.

In some embodiments, each transmission within the set has an associated symbol number and the identifier received in the indication corresponds to the symbol number of the respective transmission.

In some embodiments, the wireless device/method/computer readable program code determines a portion of the system information that is the same for each transmission in the set based on the soft-combining of the received transmissions (and determines a transmission-specific portion of the system information from only one of the transmissions).

In some embodiments, a physical random access channel (PRACH) configuration depends on the identifier associated with the respective transmission such that the PRACH configuration associated with one of the transmissions differs from the PRACH configuration associated with another of the transmissions.

In some embodiments, the indication is determined by decoding the indication from a reference signal.

In some embodiments, the indication is determined based on different scrambling used for each transmission within the set.

In some embodiments, the indication is determined based on each transmission using a different primary synchronization sequence (PSS), a different secondary synchronization sequence (SSS), or a different PSS/SSS combination.

In some embodiments, the indication received other than in the system information together with an explicit indication received in each system information transmission enables the wireless device to determine that the transmissions belong to the set of system information transmissions and are therefore capable of being soft-combined.

In some embodiments, the set of system information transmissions comprises a sweep of narrow beams that provide spatial repetition of the system information.

In some embodiments, the set of system information transmissions comprises temporal repetitions of wide beams or omnidirectional beams.

In some embodiments, the wireless device/method/computer readable program code receives a second set of system information transmissions and determines, based on the indication, that the transmissions belonging to the first set of system information transmissions cannot be soft-combined with the transmissions belonging to the second set of system information transmissions.

In some embodiments, the wireless device/method/computer readable program code receives a second set of system information transmissions. The indication received other than in the system information together with an explicit indication received in each system information transmission in the first and second sets of system information transmissions enables the wireless device to determine that the transmissions belonging to the first set of system information transmissions cannot be soft-combined with the transmissions belonging to the second set of system information transmissions, that one of the transmissions belonging to the first set of system information transmissions is capable of being soft-combined with the other transmissions belonging to the first set of system information transmissions, and that one of the transmissions belonging to the second set of system information transmissions is capable of being soft-combined with the other transmissions belonging to the second set of system information transmissions.

In some embodiments, the wireless device/method/computer readable program code determine, based on the indication, that the set of system information transmissions comprises a plurality of subsets of transmissions such that transmissions within the same subset are capable of being coherently soft-combined and transmissions within different subsets can only be non-coherently soft-combined.

It is to be noted that any feature of any of the embodiments disclosed herein may be applied to any other embodiment, wherever appropriate. Likewise, any advantage of any of the embodiments may apply to the other embodiments, and vice versa. As discussed above, advantages of certain embodiments include making it transparent for the wireless device whether the SI (or relevant parts of the SI) is transmitted using sweeping of narrow beams or repetition of wide (or omnidirectional) beams. This may reduce network node and wireless device complexity with respect to transmission and reception of SI, respectively. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION

DETAILED DESCRIPTION

Figure 1:
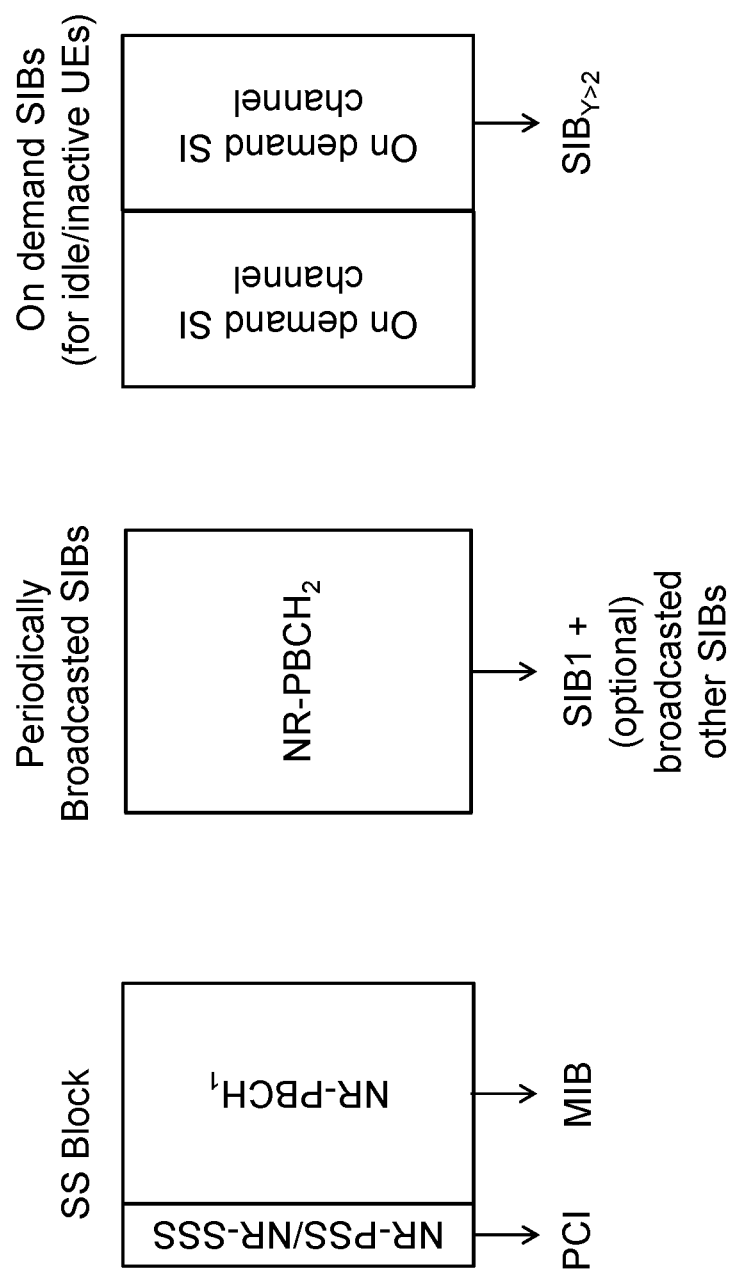
FIG. 1 illustrates a schematic overview of a potential solution for NR system information distribution, in accordance with certain embodiments.

Some of the embodiments contemplated herein will now be described more fully hereinafter with reference to the accompanying drawings. Other embodiments, however, are contained within the scope of this disclosure and the invention should not be construed as limited to only the embodiments set forth herein; rather, these embodiments are provided by way of example to convey the scope of the inventive concept to those skilled in the art. Like numbers refer to like elements throughout the description.

A first approach taken in the proposed solution is to introduce means to make it transparent for the UE whether the SI (or relevant parts of the SI) is transmitted using sweeping of narrow beams or repetition of wide (or omnidirectional) beams. This is desirable to get a unified solution and to limit the complexity, especially for UE implementations. The UE should thus be able to use the same behavior whether wide (or omnidirectional) or narrow beams are used. Since wide (or omnidirectional) beams are assumed to require soft-combining at the coverage edge, the UE should be able to soft-combine multiple transmissions of periodically broadcast SI. This would in principle be possible for narrow beams too (provided that multiple beams reach the UE), but it does not work together with different SI content in different beams (or sets of beams) (to support analog beamforming, as described above).

A drawback with this "first approach" is that if the UE knows that different repetitions are transmitted in the same beam (time-repetition) then it can perform coherent soft combining of the repetitions it can receive. If the UE does not know that it has to assume that different received repletion of SI could have been transmitted using different beamforming (e.g., using beam-sweeping) and in that case only non-coherent soft combining can be performed. Without knowing for sure if the network uses temporal-repetition or spatial-repetition, the UE must perform non-coherent soft combining. In some embodiments, the UE is provided with information that enables it to know if coherent soft combining can be used. Examples are further discussed below under the heading further described below Indication of Coherent vs. Non-Coherent Combining. In some embodiments, the UE can also perform hypothesis testing, e.g., try to receive the SI using only non-coherent combination and if that fails try to receive the SI using coherent combination (or vice versa).

The proposed solution therefore includes keeping the SI content the same in multiple transmissions, irrespective of whether the multiple transmissions are transmitted using repeated wide (or omnidirectional) or swept narrow beams. To support different configurations, e.g., different PRACH configurations, and/or differentiation, e.g., in terms of UE behavior, depending on which transmission in a multi-SI transmission the UE receives, the solution, as a first main solution component, comprises an implicit indication of the transmission's (not included in the actual SI content) order in a multi-SI transmission (e.g., which narrow beam in a sweep or which repetition of a wide (or omnidirectional) beam).

The implicit indication may be provided in different ways (as different embodiments), for example:

An additional component in the SS Block, e.g., a signal with properties similar to the properties of a synchronization signal and/or a reference signal. Different signal sequences would be used for each transmission of a multi-transmission of SI and the mapping between signal sequence and transmission number would preferably be hardcoded through standardization but may also be indicated in the SI. For instance, initial access could be performed using hardcoded mapping in the standard, whereas once the UE has read SI, the mapping for subsequent accesses could be derived from the SI. This new signal may be referred to as "indication signal" (IS).

Scrambling of the SI content. Different scrambling is applied to the SI content in each transmission of a multi-transmission of SI. The mapping between scrambling and transmission number would preferably be hardcoded through standardization but may also be indicated in the SI. For instance, initial access could be performed using hardcoded mapping in the standard, whereas once the UE has read SI, the mapping for subsequent accesses could be derived from the SI. (In some embodiments, the indication in the SI may be a later step, i.e., what the time offset is used for, e.g., select a certain RA configuration).

Different NR-SSSs. A different NR-SSS sequence would be used in the SS Block for each transmission of a multi-transmission of SI. The mapping between NR-SSS sequence and transmission number would preferably be hardcoded through standardization. Note that this would require a substantial number of unique NR-SSS sequences, since all the different NR-SSS sequences in a multi-transmission of SI should, together with the same NR-PSS, indicate the same PCI.

Different NR-PSS/NR-SSS combinations. This is a variation of the method using only variations of the NR-SSS sequence. To reduce the required number of unique NR-SSS sequences, the number of NR-PSS sequences is also increased slightly. Now, each transmission of a multi-transmission of SI may be preceded of a different NR-PSS/NR-SSS combination. The mapping between NR-PSS/NR-SSS combination and transmission number would preferably be hardcoded through standardization. Note that all the different NR-PSS/NR-SSS combinations in a multi-transmission of SI should indicate the same PCI.

Note that the mapping between the transmission number indication property (e.g., sequence) and the transmission number allow the UE to identify the start of a sequence of SI transmissions that may be soft-combined as well as detect when two SI transmissions belong to different sets of SI transmissions for soft-combining (i.e., the UE can detect when two SI transmissions cannot be soft-combined).

A second solution component may comprise a means for configuring SI differences that depend on the transmission number. An important property of such configuration means is that the configuration parameters in the SI remains the same across a certain number of SI transmissions (in order to enable soft-combining as described above), despite allowing different configurations to be derived when taking the transmission number into account. For instance, configuration of PRACH time/frequency (T/F) resources per transmission could be:

F=subcarriers X through Y
T=subframe Q (where Q is an offset to the time of the SI transmission)

Another example where PRACH time/frequency (T/F) resources are configured per set of transmissions could be:

F=subcarriers X through Y
T=subframe Q−($N_T$ modulo M)

In the above, Q is a fixed time offset, $N_T$ is the transmission number [0, 1, 2 . . . ], M is the number of successive transmissions in a set and the expression Q−($N_T$ modulo M) defines a time offset in relation to the time of the SI transmission.

As stated above, an aspect of the proposed solution is that the UE's behavior can be the same irrespective of the mode of SI transmission. The UE thus soft-combines subsequent transmissions of the SI until it has gathered enough energy to decode the SI and uses the implicit transmission number indication to derive the SI parameters that depend on the transmission number. In the case of a sweep of narrow beams, the UE would typically gather enough energy from receiving a single beam, but can otherwise attempt to receive and soft-combine the transmission of other beams which reach the UE with some energy.

This SI transmission mode independent behavior of the UE allows full flexibility for an operator to deploy, dimension and configure its network, using any mode of SI transmission ranging from repeated wide (e.g., sector or omnidirectional) beams to a sweep of narrow high-gain beams. Narrow high-gain beams typically allows a UE to decode the SI from a single transmission (the beam most accurately directed towards the UE). The wider beams the network uses in the sweep (until the sweep collapses into repetitions of the same sector beam or omnidirectional beam) the more receptions will the UE typically need to decode the SI and the larger the zone inside the cell edge where the UE requires repetition and soft-combining to decode the SI. Hence, a sweep of narrow high-gain beams can be a single sweep where each beam is transmitted only once. A sweep of semi-wide/semi-narrow beams, on the other hand would have to be repeated (either by repeating each beam before the next beam is transmitted or by repeating the full sweeps, i.e., concluding a first full sweep before repeating the same full sweep again).

In one embodiment the SI transmission number indication as well as indication of SI transmission sequences that may be soft-combined are handled as follows.

The SI transmission number indication is sequentially incremented for each SS Block in an SS Burst. If the SI transmissions in an SS Burst are divided into multiple sets in which the SI transmissions of one set can be soft-combined, but SI transmissions in different sets cannot be soft-combined, the different sets of SI transmissions are distinguished by changing of the NR-SSS between different sets. One advantageous way of such NR-SSS changes is to toggle the NR-SSS between two different sequences between successive sets of SI transmissions. An alternative is to cycle the NR-SSS through a number N>2 different sequences for successive sets of SI transmissions. This use of the NR-SSS allows the SI transmission number indication to be incremented sequentially across sets to indicate the SI transmission number in the entire SS Burst.

In a preferred embodiment the type of SI transmission number indication is the above mentioned additional component in the SS Block (located outside the SI). This component may be a signal with properties similar to the properties of a synchronization signal and/or a reference signal, here denoted as Tertiary Synchronization Signal (TSS) (The TSS is also known as ESS (Enhanced Synchronization Signal).

With this scheme the UE will know that if it receives two or more SS Blocks within a certain time window for which the NR-SSS are identical but the TSS are different, then the UE can soft-combine these SI transmissions (e.g., NR-PBCH or Primary NR-PBCH). If the NR-SSS are different the UE cannot soft-combine the SI transmissions (e.g., NR-PBCH or Primary NR-PBCH transmissions) and it will instead select the strongest one and decode only that one. The time window would preferably be the maximum duration of an SS Burst.

Cycling through different NR-SSS is not the only way of indicating whether soft-combining is possible. It would also be possible to cycle through different NR-PSS. Note that when using multiple different NR-SSS or NR-PSS in the same cell, the combinations of NR-PSS+NR-SSS that are transmitted within the same cell must all map to the same PCI.

Yet another alternative would be to define multiple groups of "the additional SS Block component", e.g., TSS, where each group would contain the signals needed to indicate all the number in the numbers needed to provide a consecutive number series for a beam sweep of the maximum number of beams. By cycling through such groups the possibility to soft-combine can be indicated, just as when cycling through different NR-SSS or NR-PSS. If cycling through changes between two TSS series (i.e., toggling between the two series) is used in an example where groups of four SI transmissions can be soft-combined (but not across groups), then the transmission number indications for three such consecutive groups would be as follows:

$TSS_{A1}$, $TSS_{A2}$, $TSS_{A3}$, $TSS_{A4}$, $TSS_{B5}$, $TSS_{B6}$, $TSS_{B7}$, $TSS_{B8}$, $TSS_{A9}$, $TSS_{A10}$, $TSS_{A11}$, $TSS_{A12}$, . . . .

An alternative to using consecutive numbering across groups could be to restart the numbering for each group.

Indication of Coherent Vs. Non-Coherent Combining

The solution may be extended with a feature which is used to indicate to a UE whether the SI transmissions (in SS Blocks) in a SS Burst can be coherently combined or if they must be non-coherently combined. To enable this, the NR-PSS sequences could be divided into two groups. A first NR-PSS sequence group indicates that the network is using identical beamforming for all SS Blocks in a SS Burst, e.g., time repetition, which enables coherent combining. A second NR-PSS sequence group indicates that the network may use different beamforming for all SS Blocks in a SS Burst, e.g., beam-sweeping, which implies that non-coherent combining is required.

This also informs the UE if the observed SS Block can be expected to be shifted in time as the UE moves in the cell. In case a NR-PSS sequence from the first group is observed the UE knows that time repetition is used and the timing of the received SS Block will not change as the UE moves within the cell. In case a NR-PSS sequence from the second group is observed, the UE knows that beam sweeping might be used and that the timing of the received SS Block may change if the UE moves into the coverage of another beam.

This information, i.e., if the observed SS Block timing, can be expected to jump around or not during intra-cell mobility can be useful for the UE to determine when to start listening for SS Blocks (while otherwise being in a low-power sleep mode). If a NR-PSS sequence from the first group is used, the UE can listen to any SS Block in a SS Burst and can wake up just in time to receive it with a margin that takes only the internal clock drift and circuitry start up time into account. If a NR-PSS sequence from the second group is used, the UE has to assume that the SS Block may be received with a different timing than the previous SS Block reception, and in that case the UE should start listening for SS Blocks at the beginning of the SS Burst. Optionally, a UE can wake with less margin, e.g., in time for the SS Block transmission before the one the UE received the previous time it received a SS Block. This is based on the assumption that the UE knows it is moving slowly (or not at all) and that adjacent beams are transmitted sequentially and that when moving out of the coverage of a beam into another, the new beam is likely to be the adjacent one transmitted before or after the old beam. Note, however, that even if the UE moves only a little bit out of beam coverage, it is possibly that it moves into the coverage of another beam which is transmitted in an entirely different direction, but which is reflected so that it also reaches the UE in its position at the border of its old beam.

Note that the two groups of NR-PSS sequences proposed above for indication of coherent vs. non-coherent combining also could be replaced by two groups of SSS sequences, two groups of TSS sequences (or other "additional component of the SS Block) or two groups of scrambling sequences. Irrespective of which, one could also use three groups: one group indicating wide beam SS Block transmissions with time repetition, one group indicating beam sweeping of the SS Block transmissions (where the UE must be prepared that the SS Block transmissions may be shifted in time in case the UE moves into the coverage of another beam), where the SI transmissions may be non-coherently combined, and one group indicating beam sweeping of the SS Block transmissions with no soft-combining possible, because the contents of the SI in the SS Block transmissions may differ between different beams.

Symbol Number Instead of Transmission Number

In some embodiments, the implicit transmission number indication may be replaced by an implicit symbol number indication. That is, the indication indicates which symbol in a subframe the SI transmission (i.e., SS Block transmission) starts in. Note that this means that the numbering is restarted in every new subframe.

As an example, consider a radio interface structure where a subframe consists of 14 symbols, numbered from 1 to 14 (or 0 to 13) and assume that each SS Block transmission occupies 4 symbols. Assuming that the first SS Block transmission in a SS Burst will always starts in symbol number 1, the possible symbol numbers in which SS Block transmissions may start are 1, 5, 9, 13 (the first subframe and then every second subframe of a SS Burst) and 3, 7, 11 (in the second subframe and then every second subframe of a SS Burst), i.e., altogether 7 different symbol numbers. This means that in this example 7 different indicator values, e.g., TSS sequences, are needed to be able to indicate all relevant symbol numbers.

An advantage of indicating symbol number rather than transmission number is that fewer different indicator values, e.g., TSS sequences, are needed. On the other hand, rules defining symbol number dependent SI parameter modifications may be more complicated than rules defining transmission number dependent SI parameter modifications.

Figure 2:
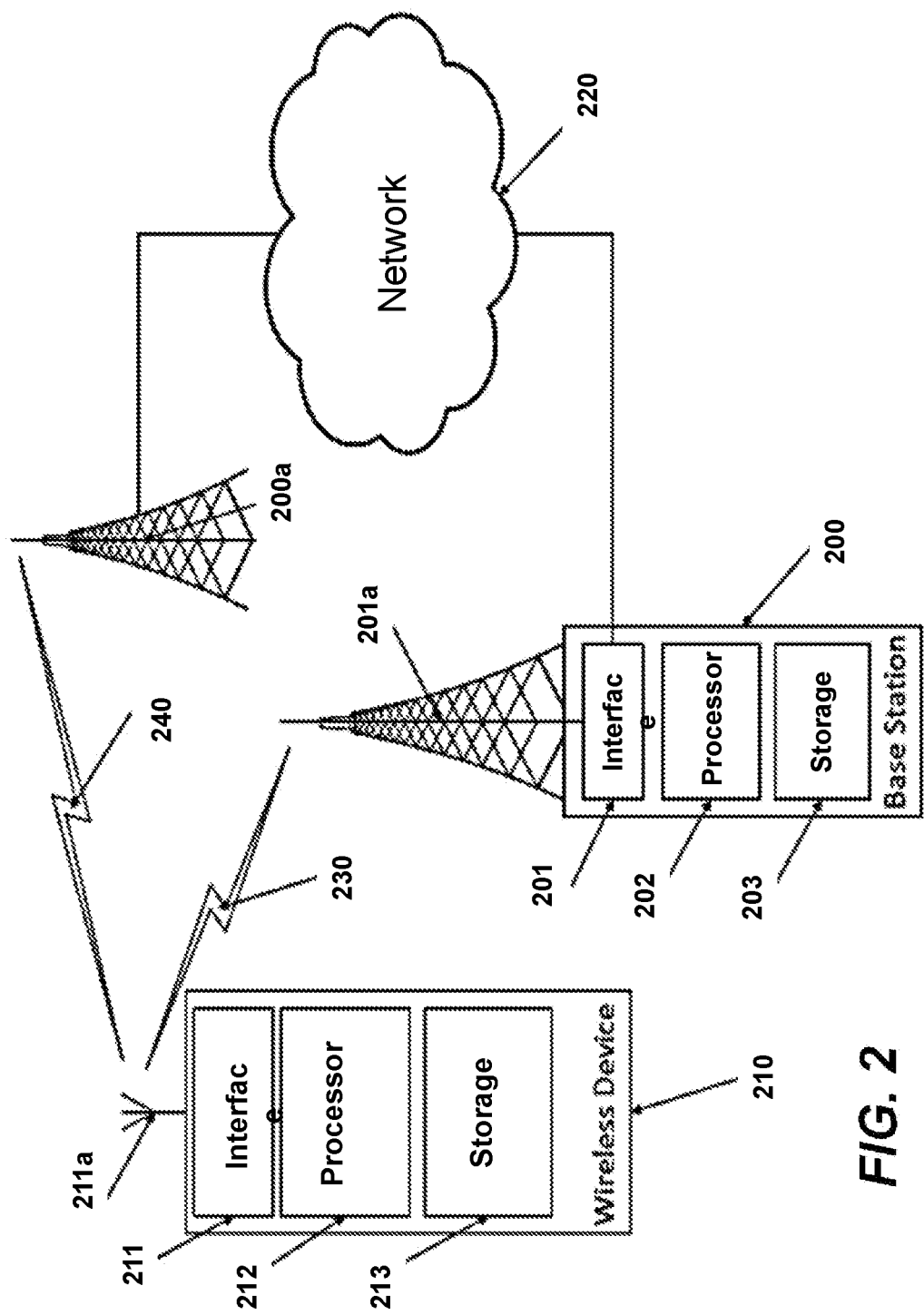
FIG. 2 illustrates a block diagram of an example wireless network, in accordance with certain embodiments.

Although the solutions described above may be implemented in any appropriate type of system using any suitable components, particular embodiments of the described solutions may be implemented in a wireless network such as the example wireless communication network illustrated in FIG. 2. In the example embodiment of FIG. 2, the wireless communication network provides communication and other types of services to one or more wireless devices. In the illustrated embodiment, the wireless communication network includes one or more instances of network nodes that facilitate the wireless devices' access to and/or use of the services provided by the wireless communication network. The wireless communication network may further include any additional elements suitable to support communication between wireless devices or between a wireless device and another communication device, such as a landline telephone.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the World-wide Interoperability for Microwave Access (WiMax), Bluetooth, and/or ZigBee standards.

FIG. 2 illustrates a wireless network comprising a more detailed view of network node 200 and wireless device (WD) 210, in accordance with a particular embodiment. For simplicity, FIG. 2 only depicts network 220, network nodes 200 and 200a, and WD 210. Network node 200 comprises processor 202, storage 203, interface 201, and antenna 201a. Similarly, WD 210 comprises processor 212, storage 213, interface 211 and antenna 211a. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, evolved Node Bs (eNBs), and gNBs (the term for a 5G/NR eNB, i.e., a 5G/NR radio base station). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device access to the wireless communication network or to provide some service to a wireless device that has accessed the wireless communication network.

As used herein, the term "radio node" is used generically to refer both to wireless devices and network nodes, as each is respectively described above.

In FIG. 2, network node 200 comprises processor 202, storage 203, interface 201, and antenna 201a. These components are depicted as single boxes located within a single larger box. In practice however, a network node may comprise multiple different physical components that make up a single illustrated component (e.g., interface 201 may comprise terminals for coupling wires for a wired connection and a radio transceiver for a wireless connection). As another example, network node 200 may be a virtual network node in which multiple different physically separate components interact to provide the functionality of network node 200 (e.g., processor 202 may comprise three separate processors located in three separate enclosures, where each processor is responsible for a different function for a particular instance of network node 200). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless device, such as WD 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201 which may be used in the wired or wireless communication of signalling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" (WD) refers to a device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication, and may in this case be referred to as a D2D communication device.

As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g., refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 2, WD 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200 and/or other WDs. WD 210 comprises processor 212, storage 213, interface 211, and antenna 211a. Like network node 200, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. Storage 213 may be used to store any calculations made by processor 212 and/or any data received via interface 211.

Interface 211 may be used in the wireless communication of signalling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

Figure 3:
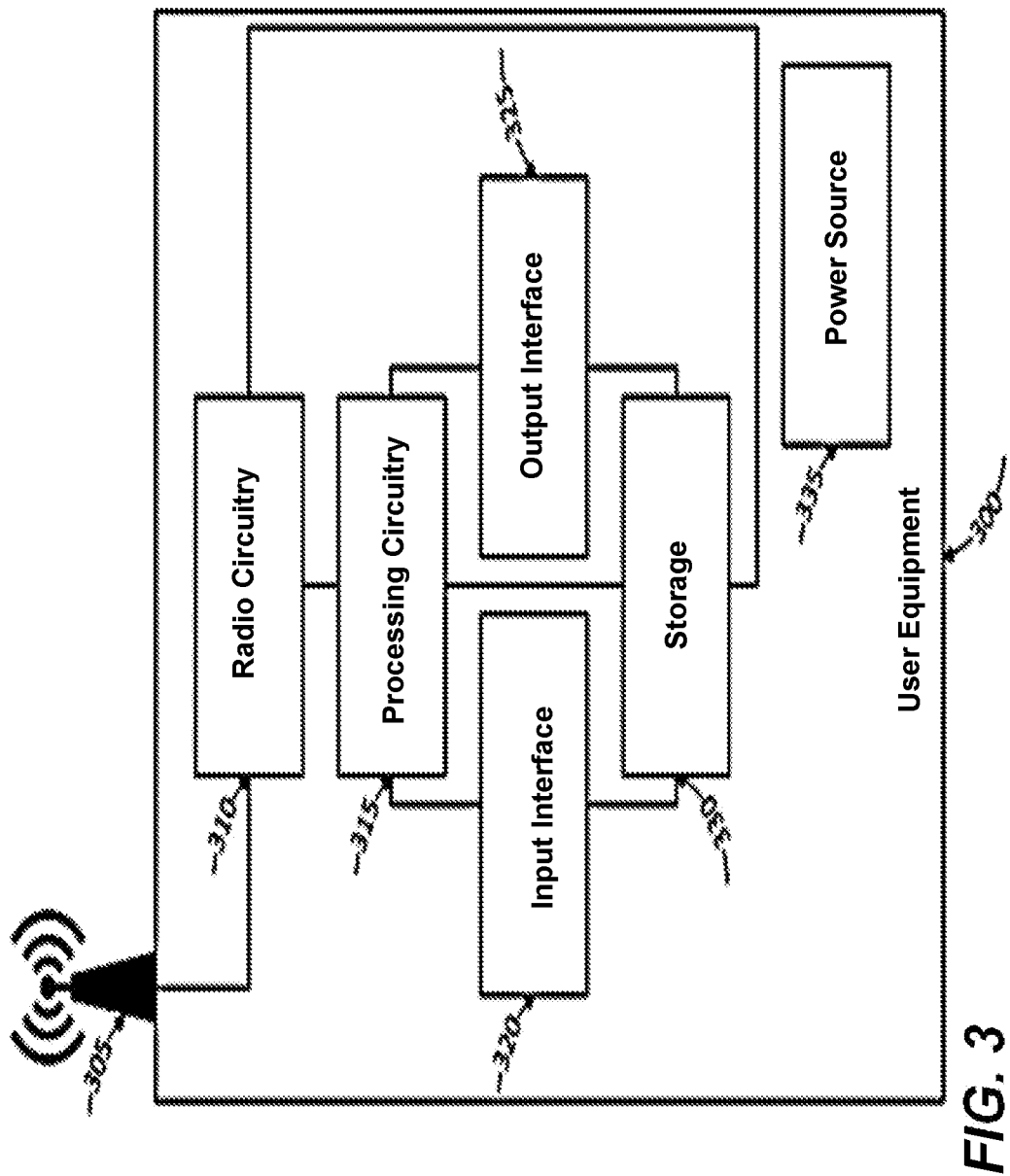
FIG. 3 illustrates a block diagram of an example user equipment, in accordance with certain embodiments.

As shown in FIG. 3, user equipment 300 is an example wireless device. UE 300 includes an antenna 305, radio front-end circuitry 310, processing circuitry 315, and a computer-readable storage medium 330. Antenna 305 may include one or more antennas or antenna arrays, and is configured to send and/or receive wireless signals, and is connected to radio front-end circuitry 310. In certain alternative embodiments, wireless device 300 may not include antenna 305, and antenna 305 may instead be separate from wireless device 300 and be connectable to wireless device 300 through an interface or port.

The radio front-end circuitry 310 may comprise various filters and amplifiers, is connected to antenna 305 and processing circuitry 315, and is configured to condition signals communicated between antenna 305 and processing circuitry 315. In certain alternative embodiments, wireless device 300 may not include radio front-end circuitry 310, and processing circuitry 315 may instead be connected to antenna 305 without radio front-end circuitry 310.

Processing circuitry 315 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 315 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 315 executing instructions stored on a computer-readable storage medium 330. In alternative embodiments, some or all of the functionality may be provided by the processing circuitry 315 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 315 alone or to other components of UE 300, but are enjoyed by the wireless device as a whole, and/or by end users and the wireless network generally.

Antenna 305, radio front-end circuitry 310, and/or processing circuitry 315 may be configured to perform any receiving operations described herein as being performed by a wireless device. Any information, data and/or signals may be received from a network node and/or another wireless device.

The processing circuitry 315 may be configured to perform any determining operations described herein as being performed by a wireless device. Determining as performed by processing circuitry 315 may include processing information obtained by the processing circuitry 315 by, for example, converting the obtained information into other information, comparing the obtained information or converted information to information stored in the wireless device, and/or performing one or more operations based on the obtained information or converted information, and as a result of said processing making a determination.

Antenna 305, radio front-end circuitry 310, and/or processing circuitry 315 may be configured to perform any transmitting operations described herein as being performed by a wireless device. Any information, data and/or signals may be transmitted to a network node and/or another wireless device.

Computer-readable storage medium 330 is generally operable to store instructions, such as a computer program, software, an application including one or more of logic, rules, code, tables, etc. and/or other instructions capable of being executed by a processor. Examples of computer-readable storage medium 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 315. In some embodiments, processing circuitry 315 and computer-readable storage medium 330 may be considered to be integrated.

Alternative embodiments of UE 300 may include additional components beyond those shown in FIG. 3 that may be responsible for providing certain aspects of the UE's functionality, including any of the functionality described herein and/or any functionality necessary to support the solution described above. As just one example, UE 300 may include input interfaces, devices and circuits, and output interfaces, devices and circuits. Input interfaces, devices, and circuits are configured to allow input of information into UE 300, and are connected to processing circuitry 315 to allow processing circuitry 315 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 300, and are connected to processing circuitry 315 to allow processing circuitry 315 to output information from UE 300. For example, output interfaces, devices, or circuits may include a speaker, a display, vibrating circuitry, a USB port, a headphone interface, or other output elements. Using one or more input and output interfaces, devices, and circuits, UE 300 may communicate with end users and/or the wireless network, and allow them to benefit from the functionality described herein.

As another example, UE 300 may include power source 335. Power source 335 may comprise power management circuitry. Power source 335 may receive power from a power supply, which may either be comprised in, or be external to, power source 335. For example, UE 300 may comprise a power supply in the form of a battery or battery pack which is connected to, or integrated in, power source 335. Other types of power sources, such as photovoltaic devices, may also be used. As a further example, UE 300 may be connectable to an external power supply (such as an electricity outlet) via an input circuitry or interface such as an electrical cable, whereby the external power supply supplies power to power source 335. Power source 335 may be connected to radio front-end circuitry 310, processing circuitry 315, and/or computer-readable storage medium 330 and be configured to supply UE 300, including processing circuitry 315, with power for performing the functionality described herein.

UE 300 may also include multiple sets of processing circuitry 315, computer-readable storage medium 330, radio circuitry 310, and/or antenna 305 for different wireless technologies integrated into wireless device 300, such as, for example, GSM, WCDMA, LTE, NR, Wi-Fi, or Bluetooth wireless technologies. These wireless technologies may be integrated into the same or different chipsets and other components within wireless device 300.

Figure 4:
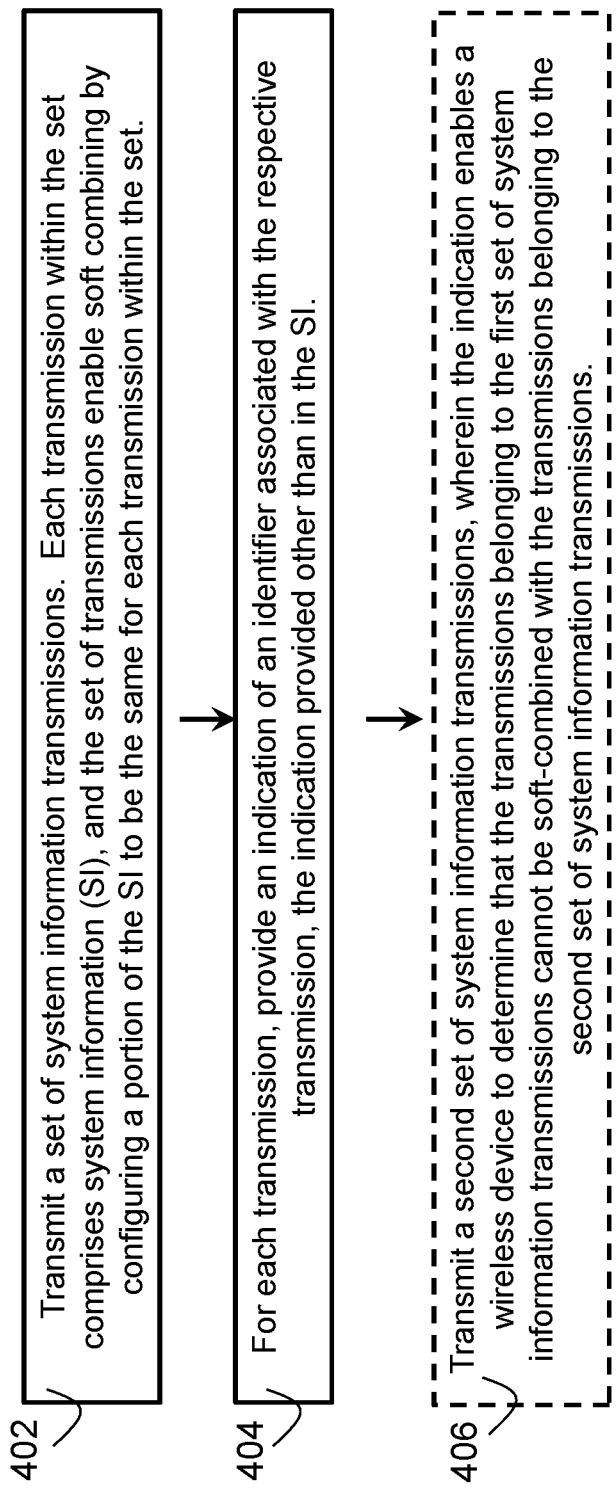
FIG. 4 illustrates an example of a method that may be performed by a network node, in accordance with certain embodiments.

FIG. 4 illustrates an example of a method that may be performed by a network node, such as network node 200, in accordance with certain embodiments. The method begins at step 402 with transmitting a set of system information transmissions. Each transmission within the set comprises system information. The set of transmissions enable soft combining by configuring a portion of the system information to be the same for each transmission within the set. As one example, the set of transmissions may enable soft combining of SSB transmissions (e.g. in different beams, as indicated by the SS Block index). As another example, the set of transmissions may enable soft combining of different redundancy versions of SIB1 transmitted on PDSCH (e.g., as indicated by a redundancy version indicator on the associated PDCCH).

The set of system information transmissions can be transmitted in any suitable manner, such as by using a sweep of narrow beams that provide spatial repetition of the system information (e.g., spatial repetition comprises a sequence of successive transmissions of narrow beams, wherein each beam has its own separate direction, such that all transmissions in the set together cover the entire intended coverage area, e.g. a cell), by using wide beams or omnidirectional beams that provide temporal repetition of the system information (e.g., temporal repetition comprises repetition in time, i.e. one after the other, of transmissions, wherein every transmission has the same direction and other transmission related parameters, such as beamforming configuration), or by using anything in between (e.g., sweeping of semi-wide/semi-narrow beams with one or a few repetitions).

The method proceeds to step 404 with providing, for each transmission, an indication of an identifier associated with the respective transmission. In some embodiments, the indication enables a wireless device to determine the transmissions that belong to the set of system information transmissions and are therefore capable of being soft-combined. In some embodiments, the identifier can be used by the wireless device to distinguish transmissions so that the wireless device can obtain a portion of the system information that is not the same for all transmissions in the set. For example, the PRACH configuration can be configured to depend on the identifier associated with the respective transmission (which allows the PRACH configuration associated with one of the transmissions to differ from the PRACH configuration associated with another of the transmissions). Although the PRACH configuration has been described as an example, other embodiments may use the identifier to allow the wireless device to obtain any other portion of the system information that depends on the identifier associated with the respective transmission.

In some embodiments, the identifier provided in the indication can be used to derive a transmission number/sequence of the respective transmission. For example, the method may transmit the transmissions according to a pre-determined order, and the transmission number/sequence corresponds to the position of the respective transmission within the pre-determined order. In some embodiments, the identifier received in the indication can correspond to a symbol number of the respective transmission.

In certain embodiments, the wireless device may derive the transmission number from the indication provided in step 404 alone. In other embodiments, the wireless device may derive the transmission number from the indication provided in step 404 together with other information. For example, the indication provided in step 404 may be considered to be an implicit indication in the sense that the indication is provided other than in system information (e.g., the indication is provided by encoding a reference signal, using different scrambling sequences, using different PSS and/or SSS configurations, or other suitable means). In certain embodiments, the systems information may provide an explicit indication that the wireless device can use together with the "implicit" indication of step 404 in order to derive the transmission number. For example, in certain embodiments, an explicit indication (SSB-index-explicit parameter) can be provided in MIB (which may be communicated via PBCH) and an implicit indication can be provided in a DMRS sequence. As an example, suppose the transmission number comprises the bits XXXYYYY. The SSB-index-explicit parameter could be used to provide the most significant bits (XXX), and the DMRS sequence could be used to provide the least significant bits (YYYY). In certain embodiments, a determination whether the SSB-index-explicit parameter is used depends on the carrier frequency. For example, when the carrier frequency is greater than 6 GHz, the maximum number of SSBs in an SS Burst Set is 64. In this case, the most significant bits may be needed to distinguish the transmission numbers. For lower carrier frequencies, if fewer SSBs are included in the beam sweep/SS Burst Set, the least significant bits provided by the implicit indication carried by the DRMS is enough on its own to distinguish the transmission numbers. In other words, the explicit and implicit indications can be used together for configurations that use a larger amount of transmission numbers (in the example, up to XXXYYYY bits), whereas the implicit indication alone can be sufficient for configurations that use a smaller amount of transmission numbers (in the example, up to YYYY bits).

In certain embodiments, the SSB-index-explicit parameter in combination with the implicit indication provided by the DMRS is unique only within one half frame, and the wireless device can keep track of the half frame through the single-bit halfFrameIndex, which is toggled at every half frame border. Hence, the DMRS, and the SSB-index-explicit parameter when present (i.e. for carrier frequencies >6 GHz), provide the SSB number (or transmission number) within the SS Burst Set and the DMRS, and the SSB-index-explicit when present, together with the halfFrameIndex parameter and the System Frame Number provide the timing information.

The indication provided in step 404 is provided other than in the system information. As examples, in some embodiments, the indication is provided by encoding the indication on a reference signal, by using different scrambling for each transmission within the set, or by using a different primary synchronization sequence (PSS), a different secondary synchronization sequence (SSS), or a different PSS/SSS combination for each transmission within the set.

For the case that the indication in step 404 is provided by encoding the indication on a reference signal, in certain embodiments, the reference signal has an associated index that maps to an indication and the encoding consists of selecting the reference signal associated with the index which maps to the indication that should be implicitly provided. A reference signal is a waveform or a sequence of bits. As such, to be able to refer to the reference signal, some condensed representation can be provided for it, e.g. in the system information. There can be a number of different available "versions" of the same reference signal in the sense that different reference signals of the same type can be created by varying the sequence of bits, as long as certain rules and constraints are fulfilled, so that the desired properties of the reference signal are maintained. For purposes of example and explanation, suppose a hypothetical reference signal, "RS-example," exists in 32 different versions. An index, such as a number in the range 0-31, can be associated with each version of RS-example. The network can then inform the wireless device that if the wireless device detects the version of RS-example that is associated with index X, then the wireless device should behave in one way (e.g., perform action A or use resource $\alpha$). Alternatively, if the wireless device detects the version of RS-example that is associated with index Y, the wireless should behave in another way (e.g., perform action B or use resource $\beta$). In certain embodiments, different RS indexes could be mapped to different PRACH resources that the wireless device should use if it wants to initiate a random access procedure. This means that (with this example) an RS index maps to an indication of a PRACH resource.

FIG. 4 illustrates optional step 406 in which the method comprises transmitting a second set of system information transmissions. The indication of step 404 enables a wireless device to determine that the transmissions belonging to the first set of system information transmissions cannot be soft-combined with the transmissions belonging to the second set of system information transmissions. Alternatively, in some embodiments, the indication enables a wireless device to determine that transmissions within the same subset (such as the first set of system information) can be coherently soft-combed and transmissions within different subsets (such as the first subset and the second subset) can only be non-coherently soft-combined.

FIGS. 5-8 illustrate examples of methods that may be performed by a wireless device, such as wireless device 210 or UE 300, in accordance with certain embodiments. With respect to FIG. 5, the method begins at step 502 with receiving a plurality of system information transmissions from a network node 200. Each transmission comprises system information (SI). Some or all of the received system information transmissions may comprise a set (or part of a set) of system information transmissions, such as a sweep of narrow beams that provide spatial repetition of the system information, wide beam or omnidirectional beam transmissions that comprises temporal repetitions of the wide beam or omnidirectional beam, or anything in between (e.g., a sweep of semi-wide/semi-narrow beams with one or a few repetitions).

The method proceeds to step 504 with determining, for each transmission, an indication of an identifier associated with the respective transmission. As discussed above, the indication enables the wireless device to determine transmissions that belong to the same set of system information transmissions and are therefore capable of being soft-combined. In some embodiments, the identifier received in the indication can correspond to a transmission number/sequence of the respective transmission. For example, the network node may transmit the transmissions according to a pre-determined order, and the transmission number/sequence corresponds to the position of the respective transmission within the pre-determined order. As discussed above with reference to FIG. 4, certain embodiments derive the transmission number based on an "implicit" indication determined in step 504 (such as DMRS sequence), and other embodiments derive the transmission number based on the "implicit" indication together with an explicit indication (such as an explicit indication received in system information from the network node, e.g., SSB-index-explicit). Thus, certain embodiments support a scenario in which the SSB-index-explicit indicates that transmissions can be soft-combined, i.e. transmissions with the same SSB-index-explicit value can be soft-combined. The explicit SSB-index-explicit parameter may have to be combined with timing information (from the wireless device's internal clock) to ensure that two transmissions with the same SSB-index-explicit value belong to the same SS Burst Set and not to two different SS Burst Sets (where the values of the SSB-index-explicit parameter are reused). That said, the wireless device can determine whether two transmissions can be soft-combined also by looking only at the implicit indication (i.e. the transmission number), since this is cycled through a repetitive cycle of values, restarting every time the SSB-index-explicit parameter changes. In some embodiments, the identifier received in the indication can correspond to a symbol number of the respective transmission.

The indication determined in step 504 is received from network node 200 other than in the system information. For example, in some embodiments, the indication is determined by decoding the indication on a reference signal. In some embodiments, the indication is determined based on different scrambling that network node 200 uses for each transmission within the set. In some embodiments, the indication is determined based on a different primary synchronization sequence (PSS), a different secondary synchronization sequence (SSS), or a different PSS/SSS combination that network node 200 provides for each transmission within the set.

The method proceeds to step 506 with soft-combining the received transmissions for which soft-combining is enabled (e.g., as determined based on the indication received in step 504).

Figure 5:
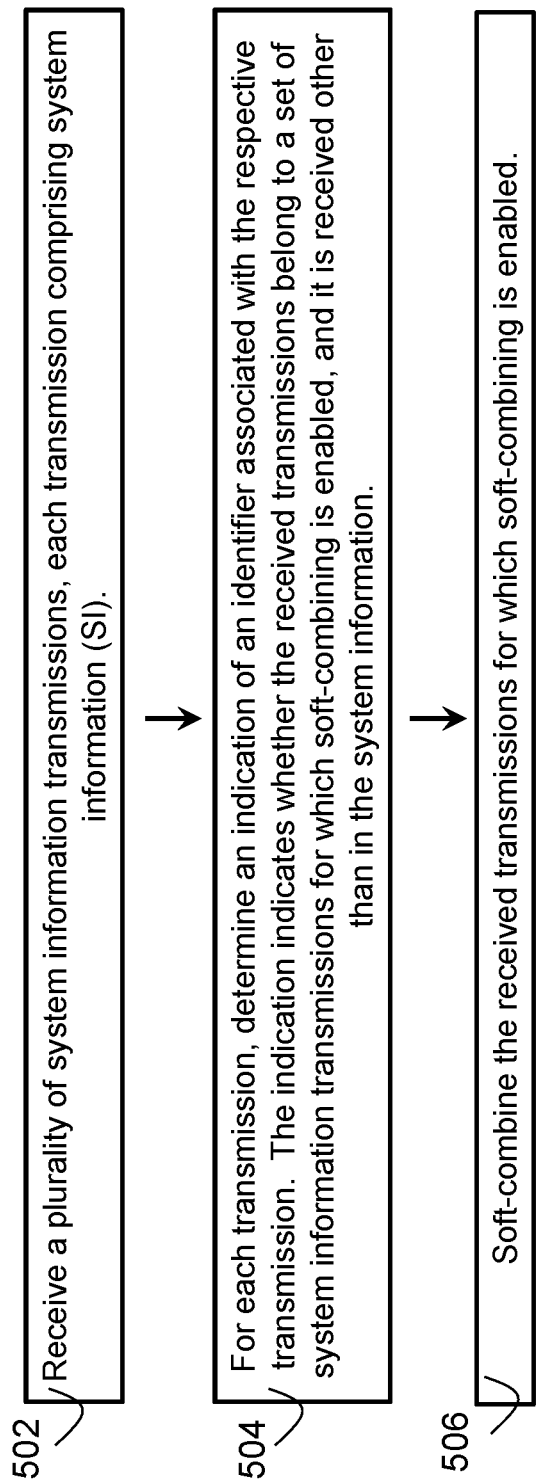
FIGS. 5-8 illustrate examples of methods that may be performed by a wireless device, in accordance with certain embodiments.
Figure 6:
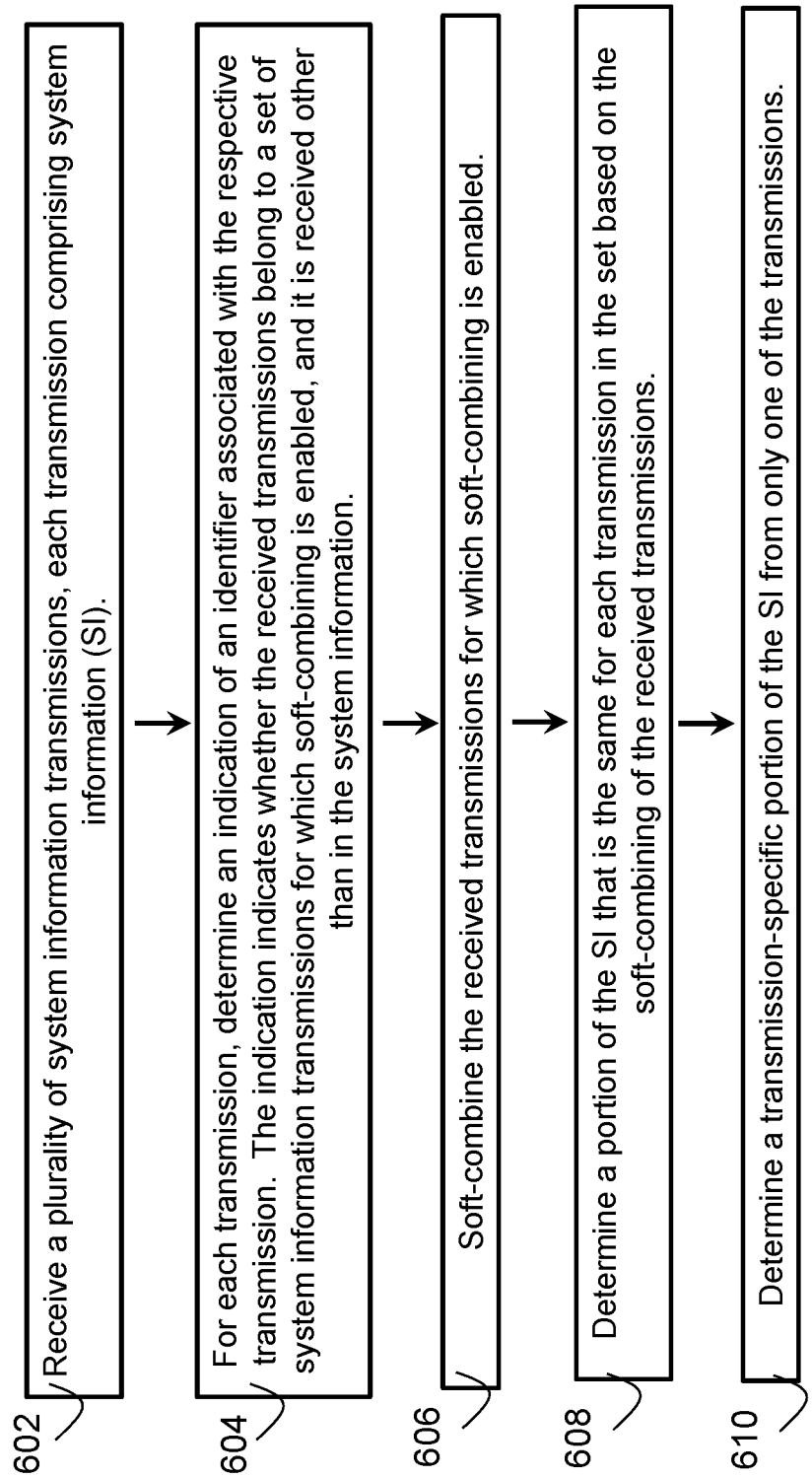

Turning to FIG. 6, steps 602, 604, and 606 are generally analogous to steps 502, 504, and 506 of FIG. 5, respectively. FIG. 6 further illustrates that the identifier determined in step 604 can be used by the wireless device to distinguish a portion of the system information that is not the same for all transmissions in the set, such as a PRACH configuration that depends on the identifier associated with the respective transmission and allows the PRACH configuration associated with one of the transmissions to differ from the PRACH configuration associated with another of the transmissions. For example, at step 608, the method determines a portion of the SI that is the same for each transmission in the set based on the soft-combining of the received transmissions. At step 610, the method determines a transmission-specific portion of the SI (such as the PRACH configuration) from only one of the transmissions, e.g., based on the identifier determined at step 604 (transmission number/sequence, symbol number, or other identifier of a particular transmission).

Figure 7:
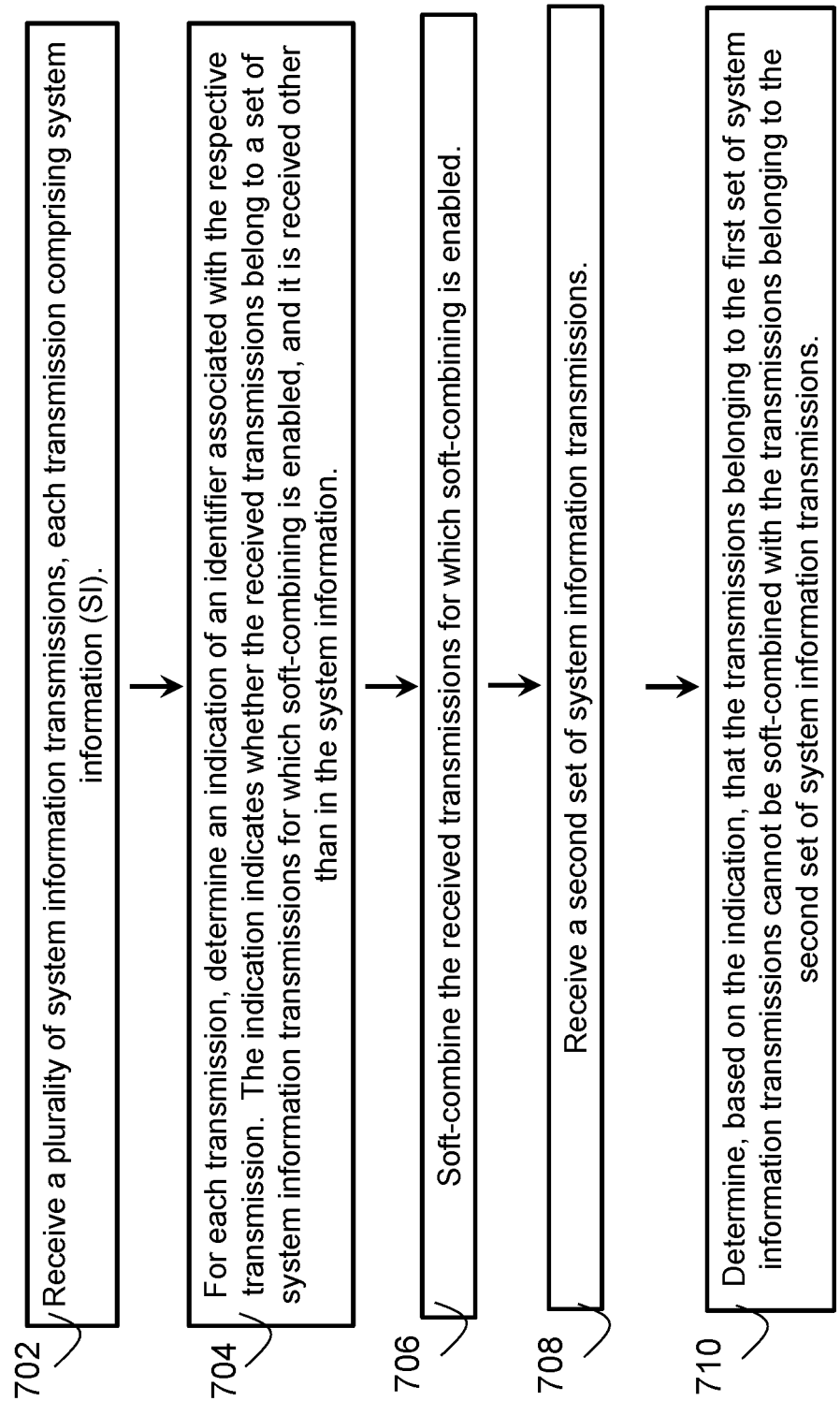

Turning to FIG. 7, steps 702, 704, and 706 are generally analogous to steps 502, 504, and 506 of FIG. 5, respectively. FIG. 7 further illustrates receiving a second set of system information transmissions (step 708) and determining, based on the indication, that the transmissions belonging to the first set of system information transmissions cannot be soft-combined with the transmissions belonging to the second set of system information transmissions (step 710).

Figure 8:
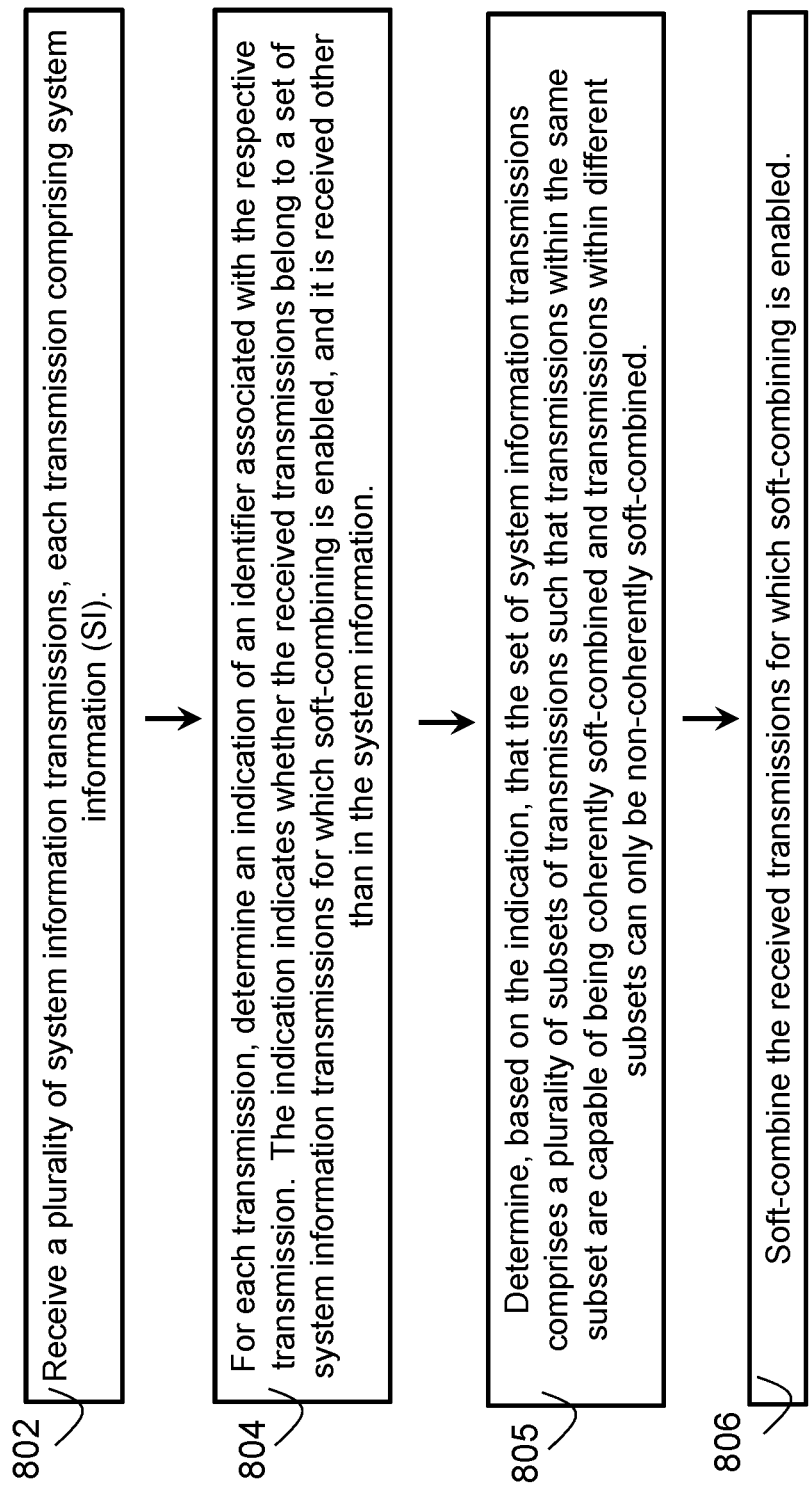

Turning to FIG. 8, steps 802, 804, and 806 are generally analogous to steps 502, 504, and 506 of FIG. 5, respectively. FIG. 8 further illustrates determining, based on the indication, that the set of system information transmissions comprises a plurality of subsets of transmissions such that transmissions within the same subset are capable of being coherently soft-combined and transmissions within different subsets can only be non-coherently soft-combined (step 805). Accordingly, step 806 comprises coherently soft-combining transmissions within the same subset and non-coherently soft-combining transmissions within different subsets of transmissions.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, storage 203 may comprise computer readable means on which a computer program can be stored. The computer program may include instructions which cause processor 202 (and any operatively coupled entities and devices, such as interface 201 and storage 203) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:
1. A network node, comprising:
processing circuitry configured to:
prepare a set of system information transmissions, wherein each transmission within the set comprises system information, and wherein the set of transmissions enable soft combining by configuring a portion of the system information to be the same for each transmission within the set; and for each transmission, prepare an indication of an identifier associated with the respective transmission, the indication provided other than in the system information; and an interface configured to transmit the set of system information transmissions and the indication of the identifier associated with each respective transmission wherein the interface is configured to transmit the set of system information transmissions using a sweep of narrow beams that provide spatial repetition of the system informationUs.

2. The network node of claim 1, wherein each transmission within the set has an associated transmission number and the transmission number can be derived at least in part from the identifier provided by the indication.

3. The network node of claim 1, wherein each transmission within the set has an associated symbol number and the identifier provided by the indication corresponds to the symbol number of the respective transmission.

4. The network node of claim 1, wherein a portion of the system information comprises contents that depend on the identifier associated with the respective transmission.

5. The network node of claim 1, wherein a physical random access channel (PRACH) configuration depends on the identifier associated with the respective transmission such that the PRACH configuration associated with one of the transmissions differs from the PRACH configuration associated with another of the transmissions.

6. The network node of claim 1, wherein the processing circuitry is further configured to prepare a second set of system information transmissions, wherein the indication enables a wireless device to determine that the transmissions belonging to the first set of system information transmissions cannot be soft-combined with the transmissions belonging to the second set of system information transmissions; and the interface is further configured to transmit the second set of system information.

7. The network node of any of claim 1, wherein the processing circuitry is further configured to prepare a second set of system information transmissions, wherein the indication provided other than in the system information together with an explicit indication provided in each system information transmission in the first and second sets of system information transmissions enables a wireless device to determine that:

the transmissions belonging to the first set of system information transmissions cannot be soft-combined with the transmissions belonging to the second set of system information transmissions;

one of the transmissions belonging to the first set of system information transmissions is capable of being soft-combined with the other transmissions belonging to the first set of system information transmissions; and one of the transmissions belonging to the second set of system information transmissions is capable of being soft-combined with the other transmissions belonging to the second set of system information transmissions; and the interface is further configured to transmit the second set of system information.

8. The network node of claim 1, wherein the indication enables a wireless device to determine that the transmissions belong to the set of system information transmissions and are therefore capable of being soft-combined.

9. The network node of claim 1, wherein the indication provided other than in the system information together with an explicit indication provided in each system information transmission enables a wireless device to determine that the transmissions belong to the set of system information transmissions and are therefore capable of being soft-combined.

10. The network node of claim 1, wherein:
the set of system information transmissions comprises a plurality of subsets of transmission; and
the indication enables coherently soft-combining transmissions within the same subset and non-coherently soft-combining transmissions within different subsets.

11. A method for use in a wireless device, the method comprising:
receiving a plurality of system information transmissions, each transmission comprising system information;
for each transmission, determining an indication of an identifier associated with the respective transmission, the indication received other than in the system information, wherein the indication indicates whether the received transmissions belong to a set of system information transmissions for which a portion of the system information is configured to be the same for each transmission within the set such that soft-combining is enabled, wherein the set of system information transmissions comprises a sweep of narrow beams that provide spatial repetition of the system information; and
soft-combining the received transmissions for which soft-combining is enabled.

12. The method of claim 11, wherein each transmission within the set has an associated transmission number and the transmission number can be derived at least in part from the identifier received in the indication.

13. The method of claim 11, wherein each transmission within the set has an associated symbol number and the identifier received in the indication corresponds to the symbol number of the respective transmission.

14. The method of claim 11, further comprising:
determining a portion of the system information that is the same for each transmission in the set based on the soft-combining of the received transmissions; and
determining a transmission-specific portion of the system information from only one of the transmissions.

15. The method of claim 11, wherein a physical random access channel (PRACH) configuration depends on the identifier associated with the respective transmission such that the PRACH configuration associated with one of the transmissions differs from the PRACH configuration associated with another of the transmissions.

16. The method of claim 11, wherein the indication is determined by decoding the indication from a reference signal.

17. The method of claim 11, wherein the indication is determined based on different scrambling used for each transmission within the set.

18. The method of claim 11, receiving a second set of system information transmissions;
determining, based on the indication, that the transmissions belonging to the first set of system information transmissions cannot be soft-combined with the transmissions belonging to the second set of system information transmissions.

19. The method of claim 11, further comprising
receiving a second set of system information transmissions;

determining, based on the indication received other than in the system information together with an explicit indication received in each system information transmission in the first and second sets of system information transmissions that:
the transmissions belonging to the first set of system information transmissions cannot be soft-combined with the transmissions belonging to the second set of system information transmissions;
one of the transmissions belonging to the first set of system information transmissions is capable of being soft-combined with the other transmissions belonging to the first set of system information transmissions; and
one of the transmission belonging to the second set of system information transmissions is capable of being soft-combined with the other transmissions belonging to the second set of system information transmissions.

20. The method of claim 11, wherein the indication received other than in the system information together with an explicit indication received in each system information transmission enables the wireless device to determine that the transmissions belong to the set of system information transmissions and are therefore capable of being soft-combined.

21. The method of claim 11, further comprising:
determining, based on the indication, that the set of system information transmissions comprises a plurality of subsets of transmissions such that transmissions within the same subset are capable of being coherently soft-combined and transmissions within different subsets can only be non-coherently soft-combined.

22. A wireless device, comprising:
an interface configured to receive a plurality of system information transmissions, each transmission comprising system information; and
processing circuitry configured to:
for each transmission, determine an indication of an identifier associated with the respective transmission, the indication received other than in the system information, wherein the indication indicates whether the received transmissions belong to a set of system information transmissions for which a portion of the system information is configured to be the same for each transmission within the set such that soft-combining is enabled, wherein the set of system information transmissions comprises a sweep of narrow beams that provide spatial repetition of the system information; and
soft-combine the received transmissions for which soft-combining is enabled.

23. The wireless device of claim 22, wherein each transmission within the set has an associated transmission number and the transmission number can be derived at least in part from the identifier received in the indication.

24. The wireless device of claim 22, wherein each transmission within the set has an associated symbol number and the identifier received in the indication corresponds to the symbol number of the respective transmission.

25. The wireless device of claim 22, the processing circuitry further configured to:
determine a portion of the system information that is the same for each transmission in the set based on the soft-combining of the received transmissions; and
determine a transmission-specific portion of the system information from only one of the transmissions.

26. The wireless device of claim 22, wherein a physical random access channel (PRACH) configuration depends on the identifier associated with the respective transmission such that the PRACH configuration associated with one of the transmissions differs from the PRACH configuration associated with another of the transmissions.

27. The wireless device of claim 22, wherein the indication is determined by decoding the indication from a reference signal.

28. The wireless device of claim 22, wherein:
the interface is further configured to receive a second set of system information transmissions; and
the processing circuitry is further configured to determine, based on the indication, that the transmissions belonging to the first set of system information transmissions cannot be soft-combined with the transmissions belonging to the second set of system information transmissions.

29. The wireless device of claim 22, wherein:
the interface is further configured to receive a second set of system information transmissions; and
the processing circuitry is further configured to determine based on the indication received other than in the system information together with an explicit indication received in each system information transmission in the first and second sets of system information transmissions that:
the transmissions belonging to the first set of system information transmissions cannot be soft-combined with the transmissions belonging to the second set of system information transmissions;
one of the transmissions belonging to the first set of system information transmissions is capable of being soft-combined with the other transmissions belonging to the first set of system information transmissions; and
one of the transmission belonging to the second set of system information transmissions is capable of being soft-combined with the other transmissions belonging to the second set of system information transmissions.

30. The wireless device of claim 22, wherein the indication received other than in the system information together with an explicit indication received in each system information transmission enables the wireless device to determine that the transmissions belong to the set of system information transmissions and are therefore capable of being soft-combined.

31. The wireless device of claim 22, the processing circuitry further configured to:
determine, based on the indication, that the set of system information transmissions comprises a plurality of subsets of transmissions such that transmissions within the same subset are capable of being coherently soft-combined and transmissions within different subsets can only be non-coherently soft-combined.

* * * * *

UNITED STATES PATENT AND TRADEMARK OFFICE
CERTIFICATE OF CORRECTION

| | | |
|---|---|---|
| PATENT NO. | : 10,917,833 B2 | Page 1 of 1 |
| APPLICATION NO. | : 16/482709 | |
| DATED | : February 9, 2021 | |
| INVENTOR(S) | : Rune et al. | |

It is certified that error appears in the above-identified patent and that said Letters Patent is hereby corrected as shown below:

In the Specification

In Column 1, Line 6, delete "PCT/162018/050615," and insert -- PCT/IB2018/050615, --, therefor.

In Column 2, Line 37, delete "can lumped" and insert -- can be lumped --, therefor.

In Column 11, Line 38, delete "(TSS) (The" and insert -- (TSS). The --, therefor.

In Column 12, Line 58, delete ""additional" and insert -- additional --, therefor.

In the Claims

In Column 25, Line 13, in Claim 1, delete "informationUs." and insert -- information. --, therefor.

In Column 25, Line 41, in Claim 7, delete "The network node of any of claim" and insert -- The network node of claim --, therefor.

In Column 26, Line 65, in Claim 19, delete "comprising" and insert -- comprising: --, therefor.

Signed and Sealed this
Twelfth Day of July, 2022

Katherine Kelly Vidal
*Director of the United States Patent and Trademark Office*